US012546663B1

United States Patent
Cubillos-Moraga

(10) Patent No.: US 12,546,663 B1
(45) Date of Patent: Feb. 10, 2026

(54) NONUNIFORM SHACK-HARTMANN WAVEFRONT SENSOR

(71) Applicant: Government of the United States as represented by the Secretary of the Air Force, Kirtland AFB, NM (US)

(72) Inventor: Max Cubillos-Moraga, Albuquerque, NM (US)

(73) Assignee: United States of America as represented by the Secretary of the Air Force, Kirtland AFB, NM (US)

( * ) Notice: Subject to any disclaimer, the term of this patent is extended or adjusted under 35 U.S.C. 154(b) by 161 days.

(21) Appl. No.: 18/599,193

(22) Filed: Mar. 7, 2024

Related U.S. Application Data

(60) Provisional application No. 63/450,648, filed on Mar. 7, 2023.

(51) Int. Cl.
*G01J 9/00* (2006.01)

(52) U.S. Cl.
CPC .................................. *G01J 9/00* (2013.01)

(58) Field of Classification Search
CPC ........................................................ G01J 9/00
See application file for complete search history.

(56) References Cited

U.S. PATENT DOCUMENTS 6,130,419 A * 10/2000 Neal ..................... G02B 5/1876
250/201.9
2004/0130705 A1 * 7/2004 Topa ......................... G01J 9/00
356/121

* cited by examiner

*Primary Examiner* — Seung C Sohn
(74) *Attorney, Agent, or Firm* — AFNWC/JA; David L. Narciso, Sr.

(57) ABSTRACT

An adaptive optics system is provided using a nonuniform Shack-Hartmann wavefront sensor (NSHWS) including an array of nonuniform lenslets, with an orthogonal polynomial used to determine a size and a placement for each lenslet and an array of detectors located in a focal plane of the array of nonuniform lenslets with a detector corresponding to each lenslet.

17 Claims, 5 Drawing Sheets

NONUNIFORM SHACK-HARTMANN WAVEFRONT SENSOR

CROSS-REFERENCE TO RELATED APPLICATIONS

This application claims the benefit of U.S. Provisional Application No. 63/450,648 filed on Mar. 7, 2023, the entire content of which is hereby incorporated by reference.

STATEMENT OF GOVERNMENT INTEREST

The invention described herein may be manufactured and used by or for the Government of the United States for all governmental purposes without the payment of any royalty.

FIELD OF THE INVENTION

The present invention relates generally to the field of wavefront sensing and more specifically to the fields of adaptive optics systems, optical system characterization, surface characterization, and ocular diagnostics by using beam steering devices and deformable mirrors to correct for aberrations, producing a much clearer image.

BACKGROUND OF THE INVENTION

For many imaging applications, it is desirable to know the phase of the incoming light. If $u(x,y)$ is the scalar optical field at the receiver, where x and y are coordinates in the plane of the receiver, the field can be written as $$u(x,y)=A(x,y)\exp(i\phi(x,y)),$$

where A is the amplitude of the light wave and $\phi$ is the phase of the optical field.

An application for wavefront sensing is in adaptive optics systems. Light that travels through the atmosphere encounters turbulence, which alters the phase and makes the image look blurry. By measuring the phase of the incoming light, adaptive optics can correct for aberrations and produce a much clearer image. One method of adaptive optics uses beam steering devices and deformable mirrors to correct for aberrations.

However, there is no way of directly measuring the phase of light. A light sensor (also referred to herein as a detector) can detect the intensity of light, thus direct measurement can only be made of the intensity, which is $|A|^2$. Various methods of indirectly deducing the phase from intensity measurements exist; one of these is the Shack-Hartmann wavefront sensor (SHWS). FIG. 1A illustrates a schematic side view representation of a SHWS 10. The SHWS 10 uses an array of lenslets 12 (also referred to as microlens), with a corresponding array of four sensors 14 (also referred to as detectors) located in the focal plane 16 of the lenslet array 18. A sensor could be a charge coupled device (CCD) or a complementary metal oxide semiconductor (CMOS). FIG. 1B illustrates a plan view schematic representation of a sensor array 20, illustrating a 4×4 array of quad-Charge Coupled Device (CCD) detectors in the focal plane, one quad-CCD detector 24 per lenslet. A perfect plane wave incident on a lenslet will focus the incoming wave to the middle of the quad-CCD detector 24, so that the relative intensities measured by each detector 24 in the quad will be the same. In the presence of aberrations such as a wavefront 26, the lenslet 12 will not focus the incoming light wave 28 to the middle of the quad-Charge Coupled Device detector but will focus to a displaced spot 22 and will provide a local measurement of the gradient of the phase.

The Shack-Hartmann wavefront sensor performs fast algorithms for the reconstruction of the phase, which is useful for real-time sensing applications. However, the Shack-Hartmann wavefront sensor has lower accuracy compared to other wavefront sensing techniques because the Shack-Hartmann wavefront sensor reconstruction algorithms approximate the phase with local, low-order polynomials. The low-order polynomials used are usually second-order polynomials. If a second-order polynomial approximation is used and if there is an absence of noise, the accuracy is of order $O(N^{-1})$ for a fixed-sized array, where O is "Big O Notation" and where N is the total number of lenslets. With this second-order polynomial approximation, to reduce the phase measurement error by half, the number of lenslets must be doubled.

SUMMARY OF THE INVENTION

The present invention overcomes the foregoing problems and other shortcomings, drawbacks, and challenges of existing imaging systems and methods. While the invention will be described in connection with certain embodiments, it will be understood that the invention is not limited to these embodiments. To the contrary, this invention includes all alternatives, modifications, and equivalents as may be included within the spirit and scope of the present invention.

In order to reduce the phase measurement error without requiring the increased number of lenslets necessary using a conventional SWHS design, a nonuniform Shack-Hartmann wavefront sensor (NSHWS) could dramatically improve the accuracy as compared to traditional SHWS. Instead of using an array of uniformly sized lenslets in the array as the SHWS employs, the NSHWS uses (as the name implies) nonuniformly sized lenslets. The size of the lenslets is not arbitrary, however; it is based on polynomial spectral methods (in particular, Chebyshev polynomials) that can converge exponentially. That is, the accuracy can be on the order $O(\exp(-\alpha N))$ for some constant $\alpha>0$.

According to one embodiment an adaptive optics system includes a nonuniform Shack-Hartmann wavefront sensor (NSHWS) having an array of nonuniform lenslets. An orthogonal polynomial is used to determine a size and a placement for each lenslet. An array of detectors is located in a focal plane of the array of nonuniform lenslets with a detector corresponding to each lenslet. Examples of the orthogonal polynomial that can be used to determine the size and placement of each lenslet include Chebyshev, Jacobi, Gegenbauer, Legendre, Hermite, Laguerre polynomials. The detectors can be quad-CCD detectors.

According to another embodiment the array of detectors size and placement correspond to the orthogonal polynomial.

According to another embodiment an adaptive optics system can include an intervening lens located between the array of nonuniform lenslets and the array of detectors so that the array of detectors forms a uniform grid of detectors of uniform size with light transmitted through each lenslet focused on the center of the corresponding detector in the absence of a wavefront.

In another embodiment, an adaptive optics system includes a nonuniform Shack-Hartmann wavefront sensor (NSHWS) having a composite array of nonuniform lenslets, with orthogonal polynomials used to determine a size and a placement for each lenslet based on calculation of a first grid of rows and columns, and orthogonal polynomials used to determine the size and placement of each lenslet within at least two lenslet subgrids, each lenslet subgrid consisting of rows and columns. An array of detectors is located in a focal plane of the array of nonuniform lenslets. The array of detectors forms a detector grid consisting of rows and columns.

In one embodiment using a composite array of nonuniform lenslets, each of the lenslet subgrids has a corresponding detector subgrid that does not overlap. Each detector in the array of detectors thus corresponds to each lenslet in the array of lenslets.

In another embodiment using a composite array of nonuniform lenslets, a first lenslet subgrid focuses on a first detector subgrid that overlaps a second detector subgrid corresponding to a second lenslet subgrid such that a single column of detectors receives light from adjacent columns of lenslets from both the first lenslet subgrid and the second lenslet subgrid.

In a further embodiment using a composite array of nonuniform lenslets with overlapping detector subgrids, the first grid is a square formed by at least four lenslet subgrids, such that a single row of detectors receives light from adjacent rows of lenslet subgrids.

In another embodiment using a composite array of nonuniform lenslets with overlapping detector subgrids, the first grid is diamond shaped formed by multiple lenslet subgrids, with a single row of detectors receiving light from adjacent rows of lenslet subgrids.

In another embodiment, a lenslet array for a Shack-Hartman wavefront sensor includes a nonuniform array of lenslets each having a size and placement in a first grid having columns and rows determined by one or more orthogonal polynomials. The orthogonal polynomials that can be used include Chebyshev, Jacobi, Gegenbauer, Legendre, Hermite and Laguerre polynomials.

In another embodiment, a lenslet array for a Shack-Hartman wavefront sensor includes a nonuniform array of lenslets each having a size and placement in a first grid having columns and rows, where the first grid is a composite Chebyshev grid of lower-order Chebyshev subgrids.

In a further embodiment of the composite Chebyshev grid lenslet array, the first grid is in the form of a square.

In another embodiment of the composite Chebyshev grid lenslet array, the first grid is in a diamond configuration of the lower-order Chebyshev subgrids.

Additional objects, advantages, and novel features of the invention will become apparent to those skilled in the art upon examination of this application or may be learned by practice of the invention. The objects and advantages of the invention may be realized and attained by means of the instrumentalities and combinations described herein and particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1A:
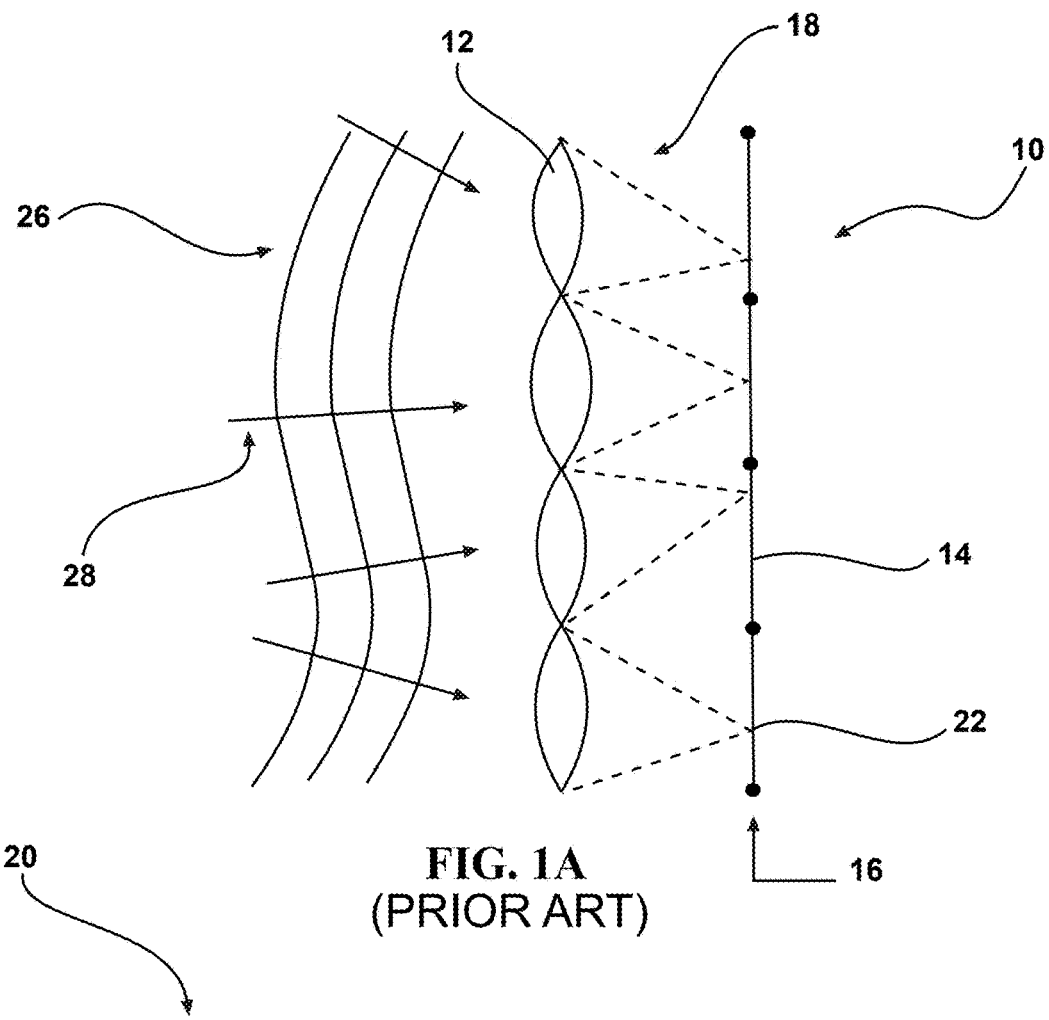
FIG. 1A illustrates a schematic side view representation of a Shack-Hartmann wavefront sensor (SHWS).
Figure 1B:
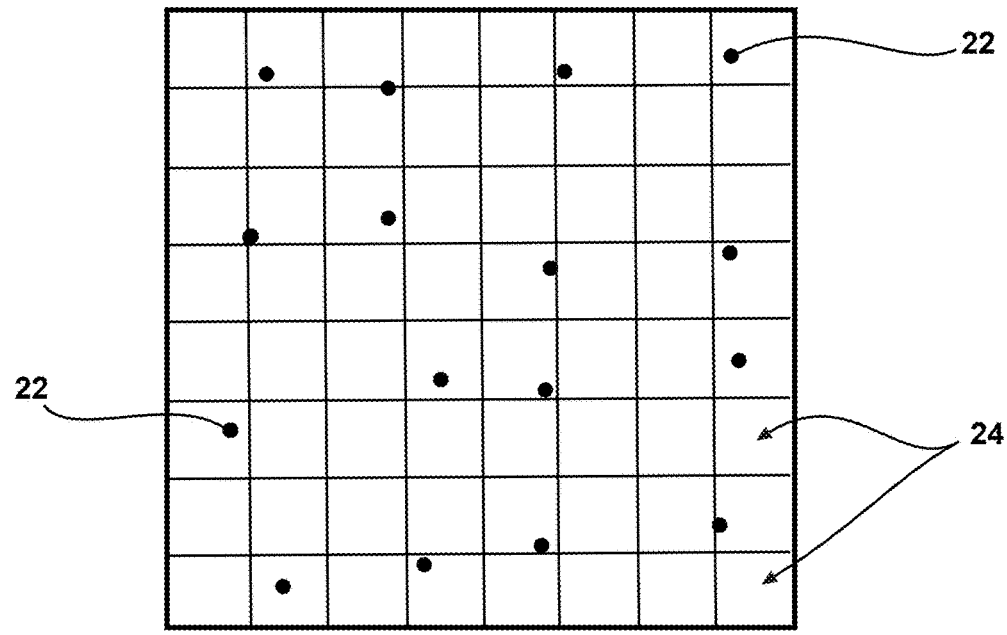
FIG. 1B illustrates a plan view schematic representation of a sensor array.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

The idea behind the NSHWS is based on approximation theory. It is well known that exponential accuracy can be achieved by sampling and interpolating a function at the quadrature nodes of a polynomial spectral method-whereas sampling at uniformly-spaced points can achieve at best power-law accuracy and it is subject to the Runge phenomenon. Thus, an orthogonal polynomial can be used to greatly increase accuracy by creating nonuniform arrays for use in the NSHWS.

Specifically, we recommend the interpolation scheme based on Chebyshev polynomials of the second kind. These have the advantage that the quadrature weights that appear in the formula are equal to the area of the lenslet; thus, the weight of a sampled point is proportional to the relative amount of light collected by the lenslet.

Figure 2A:
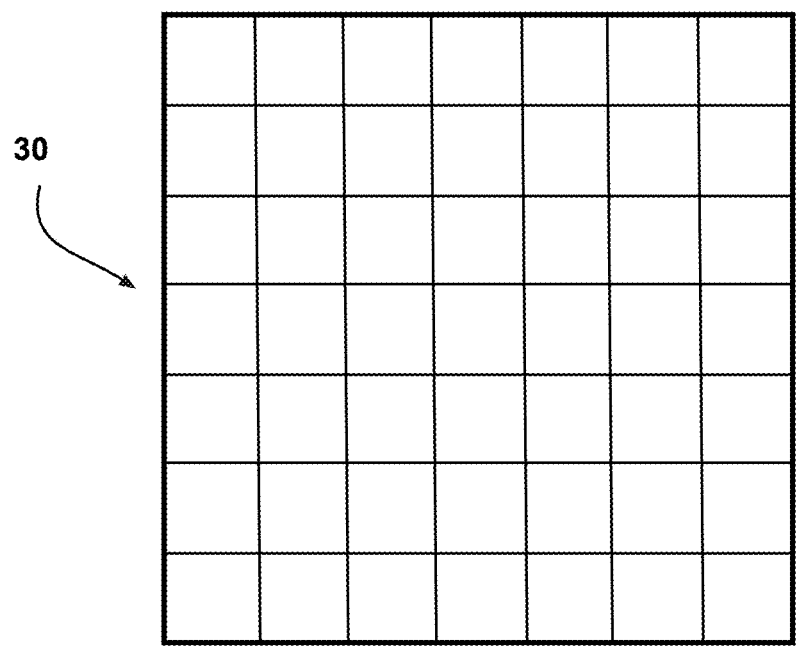
FIG. 2A illustrates a conventional uniform grid used in a SHWS.
Figure 2B:
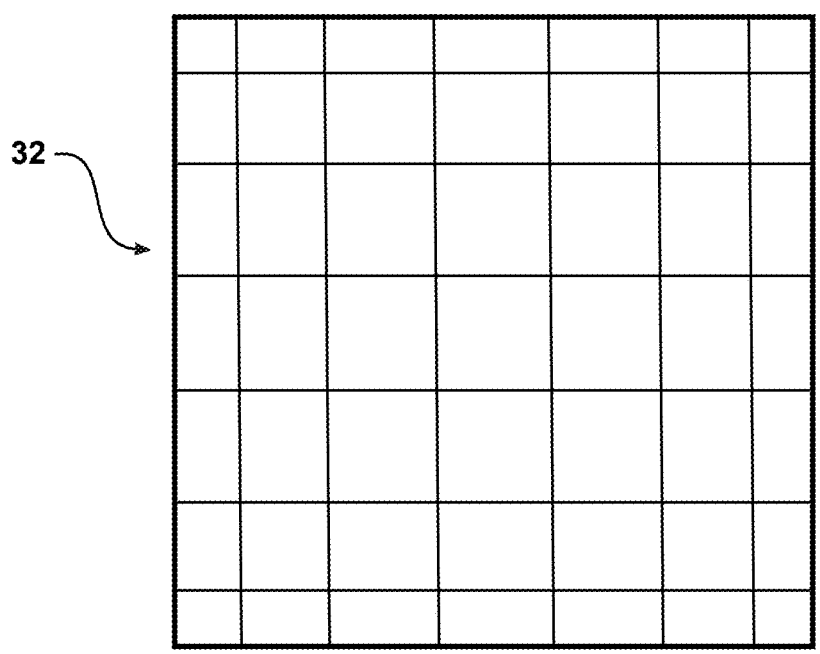
FIG. 2B illustrates a nonuniform grid used in a NSHWS.

FIG. 2A illustrates a conventional uniform grid 30 used in a SHWS. The uniform grid 30 has uniform rows and columns. FIG. 2B illustrates a nonuniform grid 32 used in a NSHWS based on a Chebyshev grid of the second kind, with nonuniform rows and columns. For simplicity, assume the lenslet array goes from −1 to 1 in both x and y directions (this can be arbitrarily rescaled to any size). Then the grid lines in the uniformly sized M×M array are given by $$x = -1 + 2j/M, \ y = -1 + 2k/M, \ 0 \le j, k \le M$$

On the other hand, the Chebyshev grid lines are given by $$x = -\cos\frac{j\pi}{M}, \ y = -\cos\frac{k\pi}{M}, \ 0 \le j, k \le M.$$

When the number of lensets grows, the size of the lenslets in a Chebyshev grid become smaller and smaller; they scale like $O(M^{-2})$ for an M×M array. This can pose a challenge to manufacturing, and the light collected by these tiny lenslets can lead to a smaller signal-to-noise ratio. To alleviate these problems, an improved configuration for a NSHWS uses a composite Chebyshev grid, defined as a larger grid of lower-order Chebyshev subgrids.

Figure 3A:
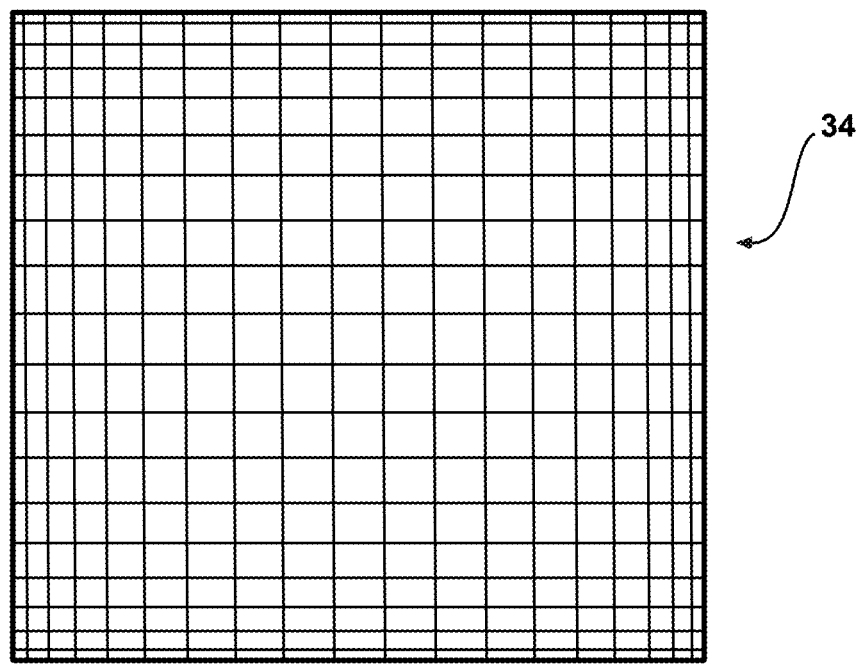
FIG. 3A illustrates a 19×19 lenslet array using a single Chebyshev grid.
Figure 3B:
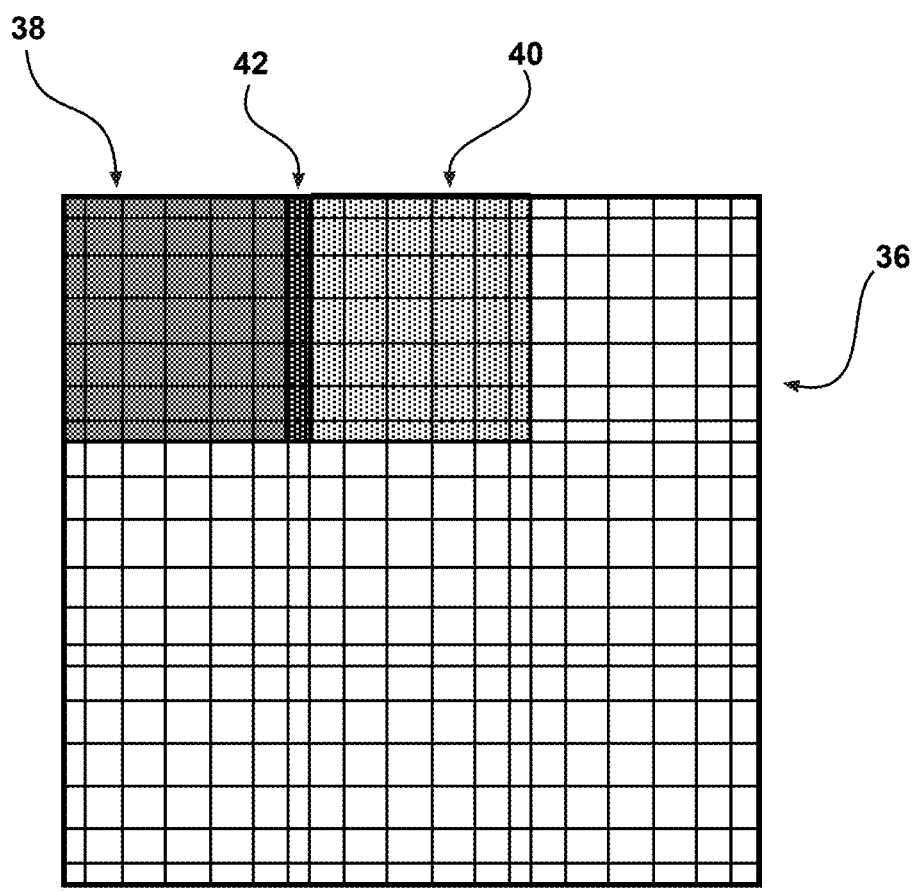
FIG. 3B illustrates a composite 3×3 grid of 7×7 Chebyshev subgrids with overlap.

FIG. 3A illustrates a 19×19 lenslet array using a single Chebyshev grid 34. This can be compared to the same number of lenslets using a composite 3×3 grid of 7×7 Chebyshev subgrids with overlap, as illustrated in FIG. 3B. The FIG. 3B illustrates the detector grid for the composite Chebysheb grid 36, with overlapping 7×7 subgrids 38, 40. The subgrids may be non-overlapping or the lenslets along the edge of adjacent subgrids in either a row or a column may overlap, such as shown in overlapping lenslet column 42. In either case, an added benefit of a composite grid is that neighboring subgrids lead to independent approximations of the phase. Each subgrid can interpolate to the same point along the shared boundary or overlap region, and the difference between the interpolations provides an estimate of the measurement error.

A NSHWS can presumably be manufactured in a way similar to a traditional SHWS. One difference is in the manufacturing of the lenslet array; instead of making them uniformly sized, they must be constructed according to the orthogonal polynomial used to determine a size and placement of nonuniform lenslets in an array of nonuniform lenslets. The array of detectors used in one embodiment of a NSHWS corresponds to determine the size and placement of the nonuniform lenslets in the array of nonuniform lenslets. In one embodiment, a Chebyshev polynomial is used to determine the grid. In another embodiment, a composite Chebyshev grid is defined as a larger grid of lower-order Chebyshev subgrids as described above.

While some embodiments use Chebyshev grids of the second kind, any grid based on orthogonal polynomials will perform comparably. These include (but are not limited to) Jacobi, Gegenbauer, Legendre, Hermite, and Laguerre polynomials. Other orthogonal functions which are not polynomials may also be used, such as Bessel functions. Nonorthogonal functions may also be used, though they are not recommended because they would lead to slower reconstruction algorithms.

Figure 4:
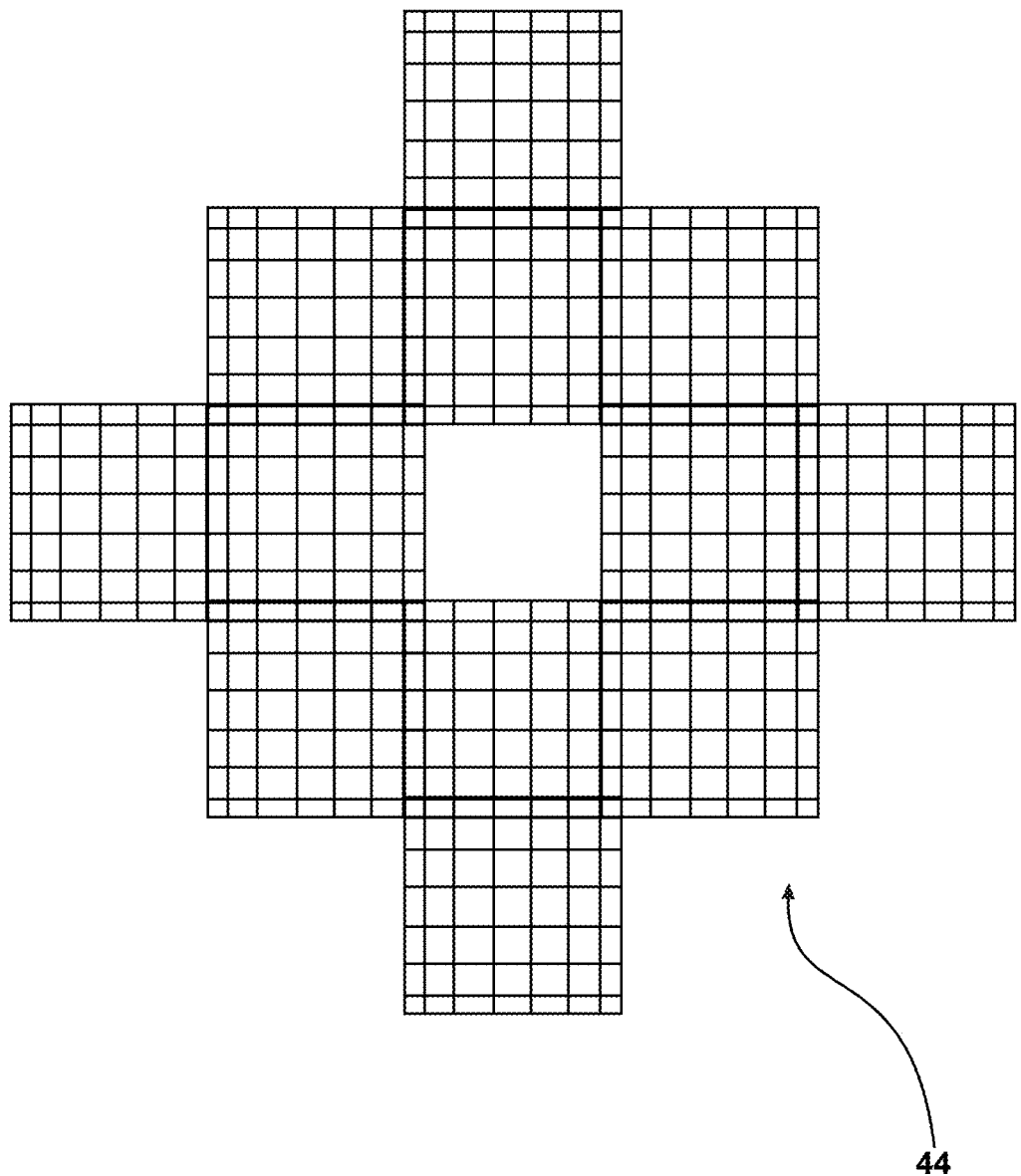
FIG. 4 illustrates a composite Chebyshev grid arranged in a diamond configuration

FIG. 3B shows a composite square array, but any geometry of composite grids is possible. For example, FIG. 4 shows a composite grid in a "diamond" configuration 44.

Figure 5A:
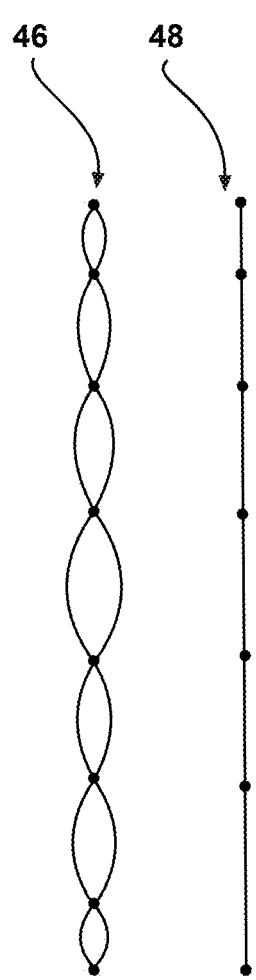
FIG. 5A is a schematic side view representation of a NSHWS.

FIG. 5A is a schematic side view representation of a NSHWS having a Chebyshev grid of lenslets 46 and a Chebyshev grid of detectors 48.

Figure 5B:
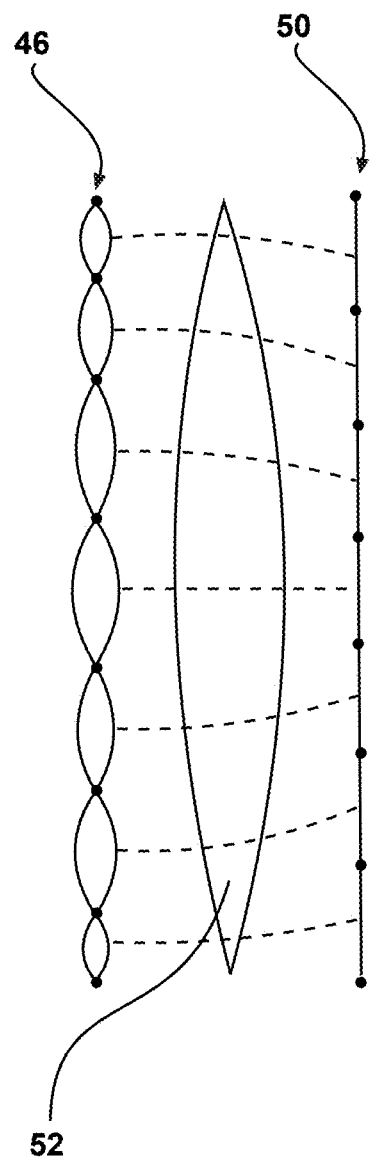
FIG. 5B is a schematic side view representation of a NSHWS with a uniform grid of detectors and an intervening lens deflecting the light from the lenslets to the detectors.

FIG. 5B is a schematic side view representation of a NSHWS with a uniform grid of detectors 50 and an intervening lens 52 deflecting the light from the lenslets to the detectors 50.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

I claim:

1. An adaptive optics system comprising:
   a nonuniform Shack-Hartmann wavefront sensor (NSHWS) including an array of nonuniform lenslets, wherein an orthogonal polynomial is used to determine a size and a placement for each lenslet; and
   an array of detectors located in a focal plane of the array of nonuniform lenslets with a detector corresponding to each lenslet.

2. The adaptive optics system of claim 1, wherein the orthogonal polynomial used to determine the size and placement of each lenslet is one of a Chebyshev, Jacobi, Gegenbauer, Legendre, Hermite and Laguerre polynomials.

3. The adaptive optics system of claim 2 wherein the orthogonal polynomial used to determine the size and placement of each lenslet is a Chebyshev polynomial.

4. The adaptive optics system of claim 1 wherein the detectors are quad-CCD detectors.

5. The adaptive optics system of claim 1 wherein the array of detectors size and placement correspond to the orthogonal polynomial.

6. The adaptive optics system of claim 1 further comprising an intervening lens located between the array of nonuniform lenslets and the array of detectors whereby the array of detectors forms a uniform grid of detectors of uniform size with light transmitted through each lenslet focused on the center of the corresponding detector in the absence of a wavefront.

7. An adaptive optics system comprising:
   a nonuniform Shack-Hartmann wavefront sensor (NSHWS) including a composite array of nonuniform lenslets, wherein orthogonal polynomials are used to determine a size and a placement for each lenslet based on calculation of a first grid, the grid consisting of rows and columns, and orthogonal polynomials are used to determine the size and placement of each lenslet within at least two lenslet subgrids, each lenslet subgrid consisting of rows and columns; and
   an array of detectors located in a focal plane of the array of nonuniform lenslets, the array of detectors forming a detector grid consisting of rows and columns.

8. The adaptive optics system of claim 7 wherein each of the lenslet subgrids has a corresponding detector subgrid that does not overlap, whereby each detector in the array of detectors corresponds to each lenslet in the array of lenslets.

9. The adaptive optics system of claim 7 wherein a first lenslet subgrid focuses on a first detector subgrid that overlaps a second detector subgrid corresponding to a second lenslet subgrid, whereby a single column of detectors receives light from adjacent columns of lenslets from both the first lenslet subgrid and the second lenslet subgrid.

10. The adaptive optics system of claim 9 wherein the first grid comprises a square formed by at least four lenslet subgrids, wherein a single row of detectors receives light from adjacent rows of lenslet subgrids.

11. The adaptive optics system of claim 9 wherein the first grid comprises a diamond shape formed by at multiple lenslet subgrids, wherein a single row of detectors receives light from adjacent rows of lenslet subgrids.

12. A lenslet array for a Shack-Hartman wavefront sensor comprising a nonuniform array of lenslets each having a size and placement in a first grid having columns and rows determined by one or more orthogonal polynomials.

13. The lenslet array of claim 12 wherein the one or more orthogonal polynomials are selected from the group of Chebyshev, Jacobi, Gegenbauer, Legendre, Hermite and Laguerre polynomials.

14. The lenslet array of claim 13 wherein the one or more orthogonal polynomials are Chebyshev polynomials.

15. The lenslet array of claim 14 wherein the first grid is a composite Chebyshev grid of lower-order Chebyshev subgrids.

16. The lenslet array of claim 15 wherein the first grid is in the form of a square.

17. The lenslet array of claim 15 wherein the first grid is in a diamond configuration of the lower-order Chebyshev subgrids.

* * * * *